US012756304B2

(12) United States Patent
Takagi

(10) Patent No.: US 12,756,304 B2
(45) Date of Patent: Oct. 6, 2026

(54) MULTIPHASE LLC RESONANT CONVERTER

(71) Applicant: GS Yuasa International Ltd., Kyoto (JP)

(72) Inventor: Kazuto Takagi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 19/341,495

(22) Filed: Sep. 26, 2025

(65) Prior Publication Data

US 2026/0025067 A1 Jan. 22, 2026

Related U.S. Application Data

(63) Continuation of application No. PCT/JP2024/010266, filed on Mar. 15, 2024.

(30) Foreign Application Priority Data

Mar. 28, 2023 (JP) ................................ 2023-050768

(51) Int. Cl.
*H02M 3/335* (2006.01)
*H02M 1/00* (2006.01)
(Continued)

(52) U.S. Cl.
CPC ........... *H02M 3/01* (2021.05); *H02M 1/0058* (2021.05); *H02M 3/28* (2013.01); *H02M 3/285* (2013.01);
(Continued)

(58) Field of Classification Search
CPC .. H02M 3/01; H02M 1/0009; H02M 3/33569; H02M 3/285; H02M 3/33571;
(Continued)

(56) References Cited

U.S. PATENT DOCUMENTS 9,106,141 B2 * 8/2015 Hosotani ........... H02M 3/33576
2010/0026095 A1 * 2/2010 Phadke ................. H02M 3/285
307/31

(Continued)

FOREIGN PATENT DOCUMENTS

JP 2017046536 A 3/2017
JP 6161982 B2 7/2017

(Continued)

OTHER PUBLICATIONS

International Search Report in PCT/JP2024/010266, mailed May 28, 2024, 2 pages.

*Primary Examiner* — Yusef A Ahmed
(74) *Attorney, Agent, or Firm* — Keating & Bennett, LLP

(57) ABSTRACT

A multiphase LLC resonant converter of N phases (N represents an integer equal to or more than two) causes N resonant converters connected in parallel to a direct current power supply to operate with a phase difference of 360°/N. One of the resonant converters includes a lower adjustment inductor connected in parallel with primary windings of the lower conversion circuits. The one of the resonant converters includes an upper adjustment inductor connected in parallel with primary windings of upper conversion circuits. Outputs including high potential output terminals and low potential output terminals of the lower conversion circuits and the upper conversion circuits star connected at neutral points via a second resonant capacitor are connected.

9 Claims, 10 Drawing Sheets

(51) Int. Cl.
*H02M 3/00* (2006.01)
*H02M 3/28* (2006.01)

(52) U.S. Cl.
CPC ... *H02M 3/33569* (2013.01); *H02M 3/33571* (2021.05); *H02M 3/33573* (2021.05)

(58) Field of Classification Search
CPC .. H02M 1/0058; H02M 3/28; H02M 3/33573; H02M 3/1584; Y02B 70/10; Y02P 80/10
See application file for complete search history.

(56) References Cited

U.S. PATENT DOCUMENTS

| | | | | |
|---|---|---|---|---|
| 2010/0328968 | A1* | 12/2010 | Adragna | H02M 3/01 363/21.02 |
| 2011/0069514 | A1* | 3/2011 | Chiba | H02M 3/01 363/21.02 |
| 2016/0254756 | A1* | 9/2016 | Yang | H01F 27/2823 363/21.02 |
| 2018/0138801 | A1* | 5/2018 | Chen | H01F 27/2804 |
| 2019/0043660 | A1* | 2/2019 | Jin | H02M 3/33592 |
| 2019/0043661 | A1* | 2/2019 | Jin | H01F 27/346 |
| 2019/0052180 | A1* | 2/2019 | Meneses Herrera | H02M 3/33592 |
| 2019/0058408 | A1* | 2/2019 | Hao | H02M 3/01 |
| 2019/0157978 | A1* | 5/2019 | Ni | H02M 1/14 |
| 2021/0408927 | A1* | 12/2021 | Zhang | H02M 3/33592 |
| 2022/0103081 | A1* | 3/2022 | Sheng | H02M 1/0058 |
| 2022/0103083 | A1* | 3/2022 | Zhou | H02M 1/0054 |
| 2022/0286055 | A1* | 9/2022 | Baranwal | H02J 7/06 |
| 2023/0223856 | A1* | 7/2023 | Sato | H02M 3/285 363/21.02 |
| 2023/0361679 | A1* | 11/2023 | Peluso | H02M 3/1586 |
| 2024/0079952 | A1* | 3/2024 | Chen | H02M 3/285 |
| 2024/0079965 | A1* | 3/2024 | Chen | H02M 3/015 |
| 2025/0047210 | A1* | 2/2025 | Chiba | H02M 3/33571 |
| 2025/0167688 | A1* | 5/2025 | Lin | H02M 3/33571 |
| 2025/0202375 | A1* | 6/2025 | Chiba | H02M 3/01 |
| 2025/0317053 | A1* | 10/2025 | Takagi | H02M 3/33569 |
| 2025/0317066 | A1* | 10/2025 | Takagi | H02M 1/0064 |

FOREIGN PATENT DOCUMENTS

| | | | |
|---|---|---|---|
| JP | 2018026910 | A | 2/2018 |
| JP | 2021035200 | A | 3/2021 |
| JP | 2021153382 | A | 9/2021 |
| JP | 2022130353 | A | 9/2022 |

* cited by examiner

MULTIPHASE LLC RESONANT CONVERTER

CROSS REFERENCE TO RELATED APPLICATIONS

This application claims the benefit of priority to Japanese Patent Application No. 2023-050768 filed on Mar. 28, 2023 and is a Continuation application of PCT Application No. PCT/JP2024/010266 filed on Mar. 15, 2024. The entire contents of each application are hereby incorporated herein by reference.

BACKGROUND OF THE INVENTION

1. Field of the Invention

The present invention relates to multiphase LLC resonant converters to convert an input voltage into an output voltage using a plurality of LLC resonant converters connected in parallel.

2. Description of the Related Art

In recent years, to achieve a larger current and a lower ripple as an output load increases, there is known a multiphase type switching power supply device in which the number of operation phases (the number of phases) is plural, and the phases are shifted to drive each operation phase (see, for example, JP-B1-6161982).

SUMMARY OF THE INVENTION

To achieve higher electrical power of a multiphase LLC resonant converter or to highly integrate circuits while keeping the electrical power, it is conceivable to increase the number of conversion circuits and extend the conversion circuits in parallel. However, there is a problem that, when excitation inductances of transformers vary, the currents are not balanced between the plurality of conversion circuits.

Example embodiments of the present invention provide multiphase LLC resonant converters that each easily achieve higher electrical power or higher integration.

A multiphase LLC resonant converter according to an example embodiment of the present invention is a multiphase LLC resonant converter of N phases, where N represents an integer equal to or more than two, to cause N resonant converters connected in parallel to a direct current power supply to operate with a phase difference of 360°/N. Each of the N resonant converters includes an upper switch and a lower switch connected in series between a positive electrode and a negative electrode of the direct current power supply. The resonant converter includes a resonant inductor including a first end connected to a connection point of the upper switch and the lower switch. The resonant converter includes m lower conversion circuits, where m represents an integer equal to or more than zero, each including a transformer including a primary winding and a secondary winding, a first resonant capacitor and a second resonant capacitor each including a first end connected to the primary winding, and a rectifier connected to both ends of the secondary winding. In the lower conversion circuit, the primary winding and the first resonant capacitor are connected between a second end of the resonant inductor and the negative electrode of the direct current power supply to configure the LLC resonant converter to operate by on/off operations of the upper switch and the lower switch together with the resonant inductor. The resonant converter includes n upper conversion circuits, where n represents an integer equal to or more than zero and at least one of m and n represents two or more, each including the transformer, the first resonant capacitor and the second resonant capacitor, and the rectifier. In the upper conversion circuit, the primary winding and the first resonant capacitor are connected between the second end of the resonant inductor and the positive electrode of the direct current power supply to configure the LLC resonant converter to operate by the on/off operations of the upper switch and the lower switch together with the resonant inductor. The resonant converter includes a lower adjustment inductor connected in parallel with the primary windings of the m lower conversion circuits. The resonant converter includes an upper adjustment inductor connected in parallel with the primary windings of the n upper conversion circuits. A second end of the second resonant capacitor in the lower conversion circuit is connected with the second end of the second resonant capacitor in the lower conversion circuit of another phase at a common neutral point that connects phases. The second end of the second resonant capacitor in the upper conversion circuit is connected with the second end of the second resonant capacitor in the upper conversion circuit of the other phase at the common neutral point that connects the phases. Outputs of the lower conversion circuit and the upper conversion circuit star-connected at the neutral point via the second resonant capacitor are connected.

According to example embodiments of the present invention, even when conversion circuits are extended in parallel, currents are balanced between the plurality of conversion circuits, so that it is possible to easily achieve higher electrical power or higher integration.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
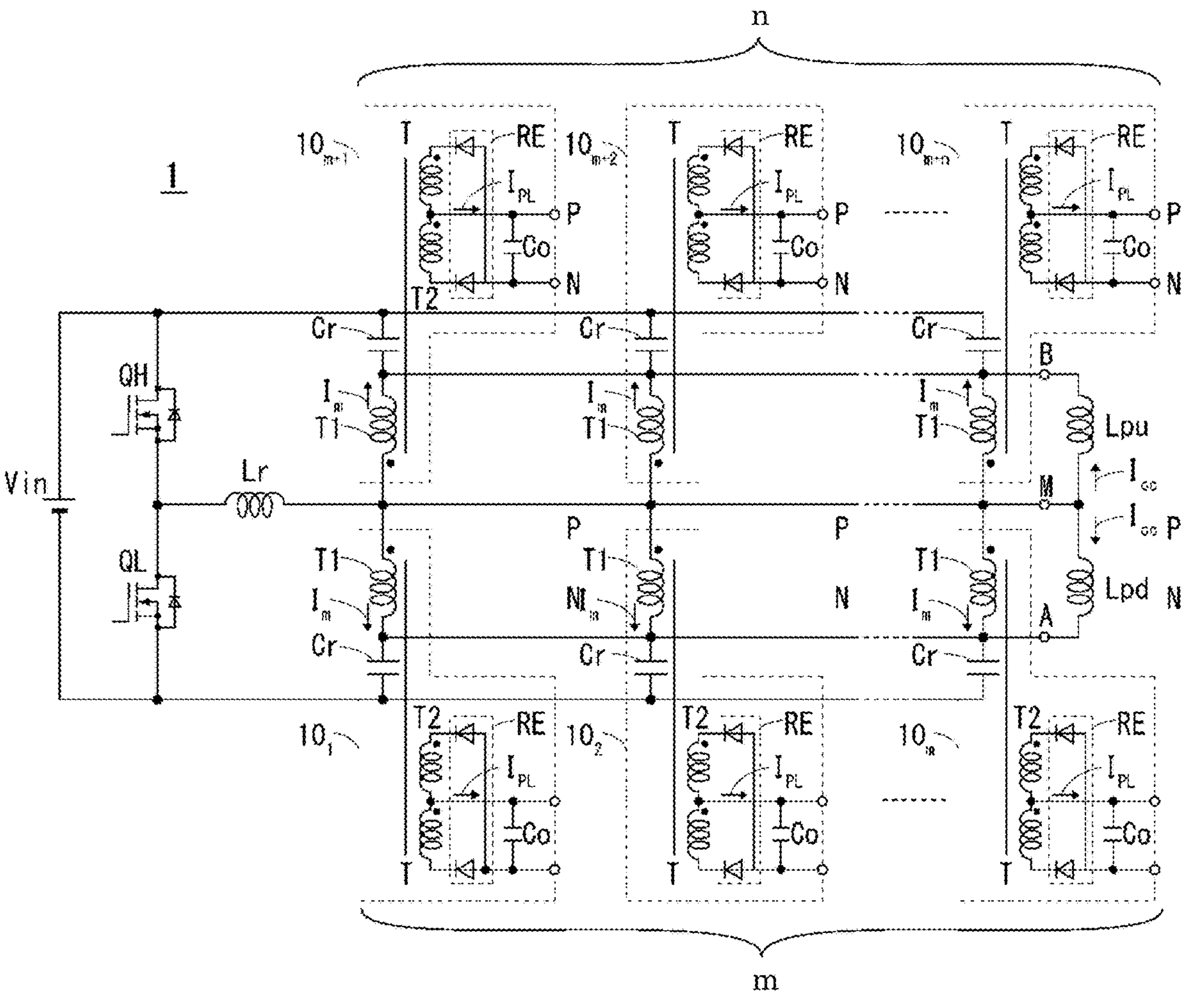
FIG. 1 is a diagram illustrating a circuit configuration according to an example embodiment of a resonant converter.

Hereinafter, example embodiments of the present invention will be described in detail with reference to the drawings. In the following example embodiments, the same reference numerals will be given to the components indicating the same functions, and description thereof will be appropriately omitted.

Referring to FIG. 1, a resonant converter 1 according to the present example embodiment includes an upper switch QH and a lower switch QL connected in series as switching legs between a positive electrode of a direct current power supply Vin and a negative electrode of the direct current power supply Vin. Each of the upper switch QH and the lower switch QL includes, for example, a Field Effect Transistor (FET). Each of the upper switch QH and the lower switch QL includes a body diode between a source and a drain.

The upper switch QH connected to the positive electrode of the direct current power supply Vin is an upper arm of the switching leg. The lower switch QL connected to the negative electrode side of the direct current power supply Vin is a lower arm of the switching leg.

The resonant converter 1 includes a resonant inductor Lr having the one end connected to a connection point of the upper switch QH and the lower switch QL.

The resonant converter 1 includes m+n conversion circuits $\mathbf{10}_1$ to $\mathbf{10}_{m+n}$ each including a transformer T, a resonant capacitor Cr, and a rectifier RE. m and n represent integers equal to or more than zero, and one of m and n is two or more.

In the m conversion circuits $\mathbf{10}_1$ to $\mathbf{10}_m$, the one end of a primary winding T1 of each transformer T is connected to the other end of the resonant inductor Lr, and the other end of the primary winding T1 of the transformer T is connected to the negative electrode of the direct current power supply Vin via the resonant capacitor Cr. That is, the primary winding T1 of the transformer T and the resonant capacitor Cr of each of the conversion circuit $\mathbf{10}_1$ to $\mathbf{10}_m$ configure an LLC resonant converter that operates by an on/off operation of the switching leg using the common resonant inductor Lr. Hereinafter, the m conversion circuits $\mathbf{10}_1$ to $\mathbf{10}_m$ provided to the lower arm are also referred to as the lower conversion circuits $\mathbf{10}_{1\ to\ m}$.

In n conversion circuits $\mathbf{10}_{m+1}$ to $\mathbf{10}_{m+n}$, the one end of the primary winding T1 of each transformer T is connected to the other end of the resonant inductor Lr, and the other end of the primary winding T1 of the transformer T is connected to the positive electrode of the direct current power supply Vin via the resonant capacitor Cr. That is, the primary winding T1 of the transformer T and the resonant capacitor Cr of each of the conversion circuits $\mathbf{10}_{m+1}$ to $\mathbf{10}_{m+n}$ configure an LLC resonant converter that operates by the on/off operation of the switching leg using the common resonant inductor Lr. Hereinafter, the n conversion circuits $\mathbf{10}_{m+1}$ to $\mathbf{10}_{m+n}$ provided to the upper arm are also referred to as the upper conversion circuits $\mathbf{10}_{m+1\ to\ m+n}$.

In the m+n conversion circuits $\mathbf{10}_1$ to $\mathbf{10}_{m+n}$, the rectifier RE rectifies an alternating current output from a secondary winding T2 of the transformer T, and outputs the alternating current from a high potential output terminal P and a low potential output terminal N. The rectifier RE can adopt a circuit system such as center tap rectification, bridge rectification, voltage doubler rectification, and Cockcroft-walton rectification. Furthermore, the rectifier RE can also adopt synchronous rectification using an FET instead of a diode. Each of the m+n conversion circuits $\mathbf{10}_1$ to $\mathbf{10}_{m+n}$ includes an output capacitor Co connected between the high potential output terminal P and the low potential output terminal N, and the rectifier RE and the output capacitor Co configure a rectifying and smoothing circuit.

By providing the m+n conversion circuits $\mathbf{10}_1$ to $\mathbf{10}_{m+n}$, the resonant converter 1 can achieve higher electrical power or higher integration of circuits while keeping the electrical power. However, if excitation inductances of the transformers T vary among the m+n conversion circuits $\mathbf{10}_1$ to $\mathbf{10}_{m+n}$, the currents are not balanced between the m+n conversion circuits $\mathbf{10}_1$ to $\mathbf{10}_{m+n}$. When, for example, the excitation inductance of the transformer T of the conversion circuit $\mathbf{10}_1$ is smaller than those of other conversion circuits 10, there is a period in which a load current $I_{PL}$ flows only in the conversion circuit $\mathbf{10}_1$ immediately after switching. This is because an excitation current $I_m$ flowing through the transformer T of the conversion circuit $\mathbf{10}_1$ is larger than those of the other conversion circuits 10, and the resonant capacitor Cr of the conversion circuit $\mathbf{10}_1$ is charged more. The excitation current $I_m$ is a current that does not send electrical power to the secondary winding T2 of the transformer T except for the load current $I_{PL}$ among the currents flowing through the primary winding T1 of the transformer T.

Hence, the resonant converter 1 includes an adjustment inductor Lpd and an adjustment inductor Lpu, and adjusts a circulating current $I_{CC}$ corresponding to an excitation current of the conventional LLC resonant converter. The resonant converter 1 is set such that the excitation inductance of the transformer T of each of the m+n conversion circuits $\mathbf{10}_1$ to $\mathbf{10}_{m+n}$ is sufficiently larger (e.g., 10 times or more) than the inductance of the adjustment inductor, and the excitation current $I_m$ is sufficiently smaller than the circulating current $I_{CC}$.

Figure 2A:
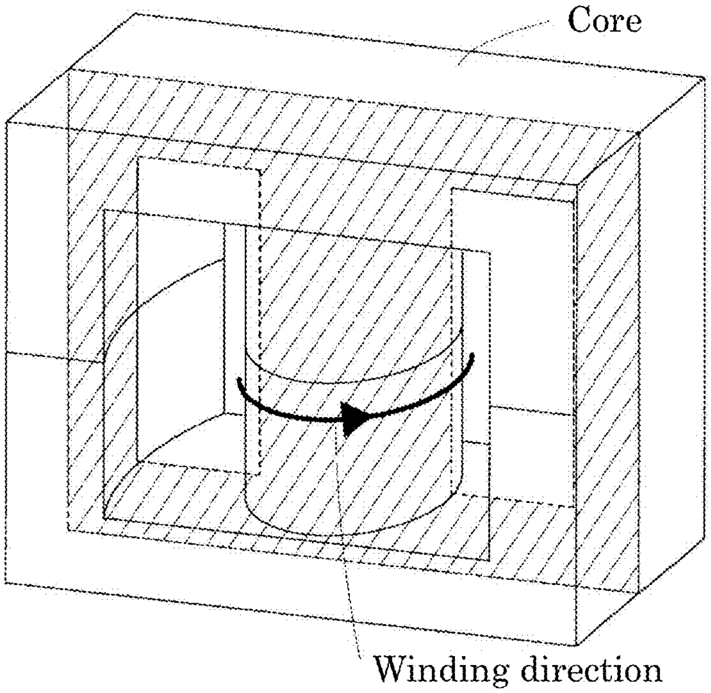
FIGS. 2A and 2B are diagrams illustrating a configuration example of a transformer illustrated in FIG. 1.
Figure 2B:
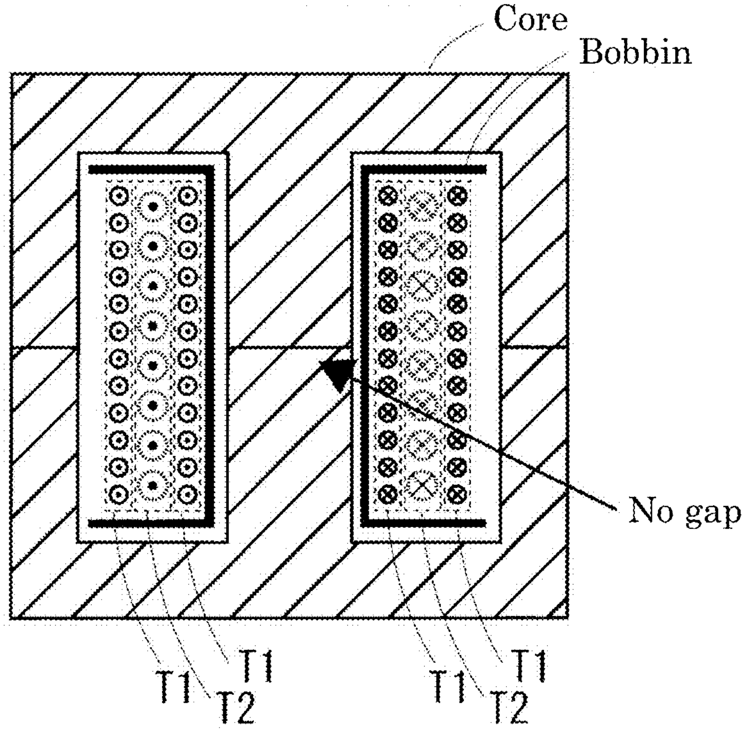

Since it is not necessary to provide a gap to a core to lower the excitation inductance for the transformer T, a gapless transformer as illustrated in FIGS. 2A and 2B can be used. FIG. 2A is a perspective view of a core. FIG. 2B is a cross-sectional view of a hatched part illustrated in FIG. 2A. In a case where the transformer T is used as a gapless transformer, the gap does not need to be adjusted, so that productivity improves. In the example illustrated in FIGS. 2A and 2B, a gapless EER core (in which two cores that are an E type and whose middle legs have cylindrical shapes are overlaid, and have no gap between the middle legs) is sandwiched and wound by the primary winding T1 and the secondary winding T2. The core of the transformer T is not limited, and may be an EI core or a PQ core.

The adjustment inductor Lpd is connected in parallel with the primary windings T1 of the transformers T of the lower conversion circuits $\mathbf{10}_{1\ to\ m}$, and adjusts the circulating currents $I_{CC}$ of the m LLC resonant converters formed in the lower arm. In other words, the transformers T of the lower conversion circuits $\mathbf{10}_{1\ to\ m}$ share the adjustment inductor Lpd that adjusts the circulating currents $I_{CC}$ of the m LLC resonant converters formed in the lower arm.

The adjustment inductor Lpu is connected in parallel with the primary windings T1 of the transformers T of the upper conversion circuits $\mathbf{10}_{m+1\ to\ m+n}$, and adjusts the circulating currents $I_{CC}$ of the n LLC resonant converters formed in the upper arm. In other words, the transformers T of the upper conversion circuits $\mathbf{10}_{m+1\ to\ m+n}$ share the adjustment inductor Lpu that adjusts the circulating currents $I_{CC}$ of the n LLC resonant converters formed in the upper arm.

The resonant converter 1 includes an external terminal M connected to a connection point of the other end of the resonant inductor Lr and the one end of each of the primary windings T1 of the transformers T of the m+n conversion circuits $\mathbf{10}_1$ to $\mathbf{10}_{m+n}$. The resonant converter 1 includes an external terminal A connected to a connection point of the other ends of the primary windings T1 of the transformers T of the m lower conversion circuits $\mathbf{10}_{1\ to\ m}$ and the one end of the resonant capacitor. The resonant converter 1 includes an external terminal B connected to a connection point of the other ends of the primary windings T1 of the transformers T of the n upper conversion circuits $\mathbf{10}_{m+1\ to\ m+n}$ and the one end of the resonant capacitor. The adjustment inductor Lpd is connected as an external inductor between the external terminal M and the external terminal A. The adjustment inductor Lpu is connected as an external inductor between the external terminal M and the external terminal B.

The resonant converter 1 can collectively adjust the circulating currents $I_{CC}$ of the m+n conversion circuits $\mathbf{10}_1$ to $\mathbf{10}_{m+n}$ only by adjusting the inductances of the adjustment inductor Lpd and the adjustment inductor Lpu. Accordingly, even if the conversion circuits $\mathbf{10}_1$ to $\mathbf{10}_{m+n}$ are extended in parallel, the currents are balanced, so that the resonant converter 1 can achieve higher electrical power and higher integration.

The resonant converter 1 can adjust the circulating current $I_{CC}$ by the adjustment inductor Lpd and the adjustment inductor Lpu, so that it is possible to easily change the specification of the resonant converter 1 without rewinding the m+n transformers T.

In the resonant converter 1, a resonance current ir flowing through the primary side of the m+n conversion circuits $\mathbf{10}_1$ to $\mathbf{10}_{m+n}$ is superimposed by the one resonant inductor Lr, and (m+n) ir currents flow in the resonant inductor Lr. Accordingly, as for a voltage $V_L$ to be applied to the resonant inductor Lr, comparison of an inductance $L_1$ of the resonant inductor Lr in a case where the number of the conversion circuits 10 is one and an inductance $L_2$ of the resonant inductor Lr in a case where the number of the conversion circuits 10 is (m+n) is as expressed in following equation (1).

[Mathematical formula 1]

$$v_L = L_1\frac{di_r}{dt} = L_2\frac{d(m+n)i_r}{dt} = \frac{L_1}{(m+n)}\frac{d(m+n)i_r}{dt} \tag{1}$$

The inductance $L_2$ of the resonant inductor Lr in a case where the number of the conversion circuits 10 is (m+n) can be reduced to 1/(m+n) of the inductance $L_1$ of the resonant inductor Lr in a case where the number of the conversion circuits 10 is one. Accordingly, in the case where the number of the conversion circuits 10 is (m+n), it is possible to reduce the size of the resonant inductor Lr, and achieve a planar structure or a coreless structure.

The resonant inductor Lr is common between the m+n conversion circuits $\mathbf{10}_1$ to $\mathbf{10}_{m+n}$ in the resonant converter 1, so that, even if capacitances $C_1$ to $C_{m+n}$ of the resonant capacitor Cr vary, the balance between currents is not greatly undermined. Furthermore, as expressed in following equation (2), a resonance frequency $\omega_r$ is made uniform. In equation (2), an average value of the capacitances $C_1$ to $C_{m+n}$ is $C_r$.

[Mathematical formula 2]

$$\omega_r = \frac{1}{\sqrt{\frac{L_r}{m+n}\sum_{j-l}^{m-n} C_j}} \approx \frac{1}{\sqrt{L_r C_r}} \tag{2}$$

Figure 3A:
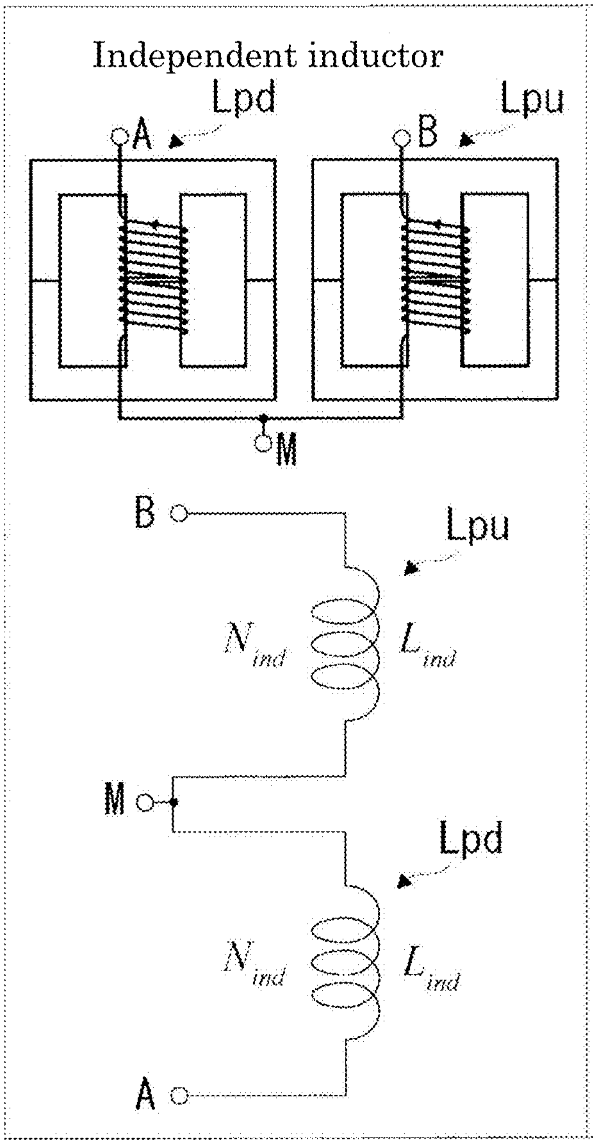
FIGS. 3A and 3B are diagrams illustrating a configuration example of an adjustment inductor illustrated in FIG. 1.
Figure 3B:
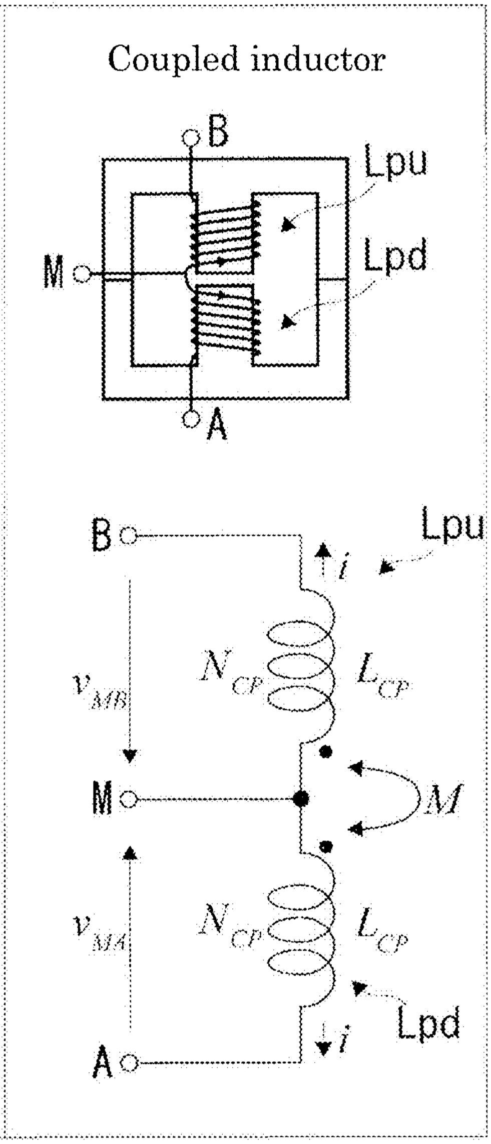

The adjustment inductor Lpd and the adjustment inductor Lpu may be each an independent inductor formed by winding a winding around each core as illustrated in FIG. 3A, or may be each a coupled inductor formed by winding a winding around the same core as illustrated in FIG. 3B. Although the schematic diagram of the coupled inductor illustrated in FIG. 3B illustrates split winding for the sake of convenience, sandwich winding or bifilar winding may be used practically.

In a case where the adjustment inductor Lpd and the adjustment inductor Lpu are independent inductors, the number of the lower conversion circuits $\mathbf{10}_{1\ to\ m}$ and the number of the upper conversion circuits $\mathbf{10}_{m+1\ to\ m+n}$ need to be the same (m=n). An inductance $L_{ind}$ can be expressed as $$L_{ind} = N_{ind}^2/R$$

using a number of turns $N_{ind}$ and a magnetic resistance R of the core.

In a case where the adjustment inductor Lpd and the adjustment inductor Lpu are coupled inductors, cumulative connection of performing winding such that magnetic fluxes are applied to each other when a current flows from the connection point of the windings to each winding (M→A and B) is used. Consequently, even if the number of the lower conversion circuits $\mathbf{10}_{1\ to\ m}$ is different from the number of the upper conversion circuits $\mathbf{10}_{m+1\ to\ m+n}$ (even if m≠n), it is possible to balance currents between the m+n conversion circuits $\mathbf{10}_1$ to $\mathbf{10}_{m+n}$.

In a case where the adjustment inductor Lpd and the adjustment inductor Lpu are coupled inductors, the resonant converter 1 also has the following effects.

It is possible to reduce variation of inductances between the adjustment inductor Lpd and the adjustment inductor Lpu.

The number of cores used for the adjustment inductor Lpd and the adjustment inductor Lpu may be one.

It is possible to reduce the number of turns of windings of the adjustment inductor Lpd and the adjustment inductor Lpu compared to the case where the adjustment inductor Lpd and the adjustment inductor Lpu are the independent inductors.

In the case of the coupled inductors, a self-inductance $L_{CP}$ and the mutual inductance M of each winding are expressed as $$L_{CP} = N_{CP}^2/R$$

$$M = kN_{CP}N_{CP}/R = L_{CP}$$

assuming tight coupling (k=1) using a number of turns $N_{CP}$ and the magnetic resistance R of the core.

When a current i flows from the connection point of the windings to each winding, inter-terminal voltages $V_{MA}$ and $V_{MB}$ Of the coupled inductor are $$V_{MA} = V_{MB} = (L_{CP} + M)di/dt = 2L_{CP}di/dt,$$

a synthetic inductance for the current i in each winding is twice the self-inductance $L_{CP}$.

Accordingly, to obtain an inductance equal to that of the independent inductor by the coupled inductor ($L_{ind}=2L_{CP}$), the number of turns $N_{CP}$ of the winding in the coupled inductor may be $N_{CP}=N_{ind}/\sqrt{2}$. That is, when a magnetization curve is linear and a magnetoresistance is equal, the number of turns $N_{CP}$ of the winding in the coupled inductor can be reduced to $1/\sqrt{2}$ (=0.71) compared to the number of turns $N_{ind}$ of the winding in the independent inductor.

Figure 4:
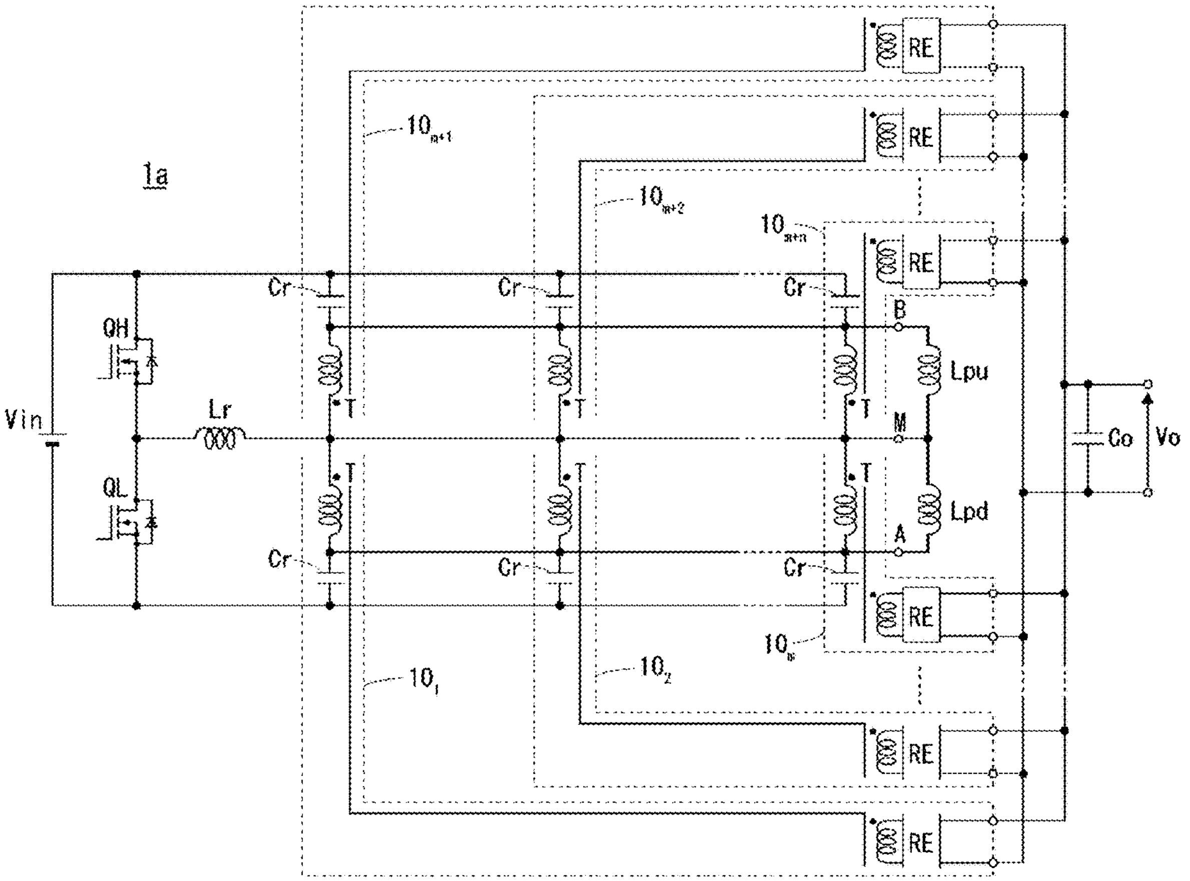
FIG. 4 is a diagram illustrating a configuration example where outputs of conversion circuits are connected in parallel.

In a resonant converter 1*a* illustrated in FIG. 4, outputs of the m+n conversion circuits $\mathbf{10}_1$ to $\mathbf{10}_{m+n}$ are connected in parallel, and the output capacitor Co is collectively connected to an overall output Vo. The adjustment inductor Lpd and the adjustment inductor Lpu may be independent inductors or may be coupled inductors. The output capacitor Co may be divided and connected to each of the m+n conversion circuits $\mathbf{10}_1$ to $\mathbf{10}_{m+n}$. The resonant converter 1*a* can easily increase the output to a higher current by connecting the outputs from the m+n conversion circuits $\mathbf{10}_1$ to $\mathbf{10}_{m+n}$ in parallel.

Figure 5:
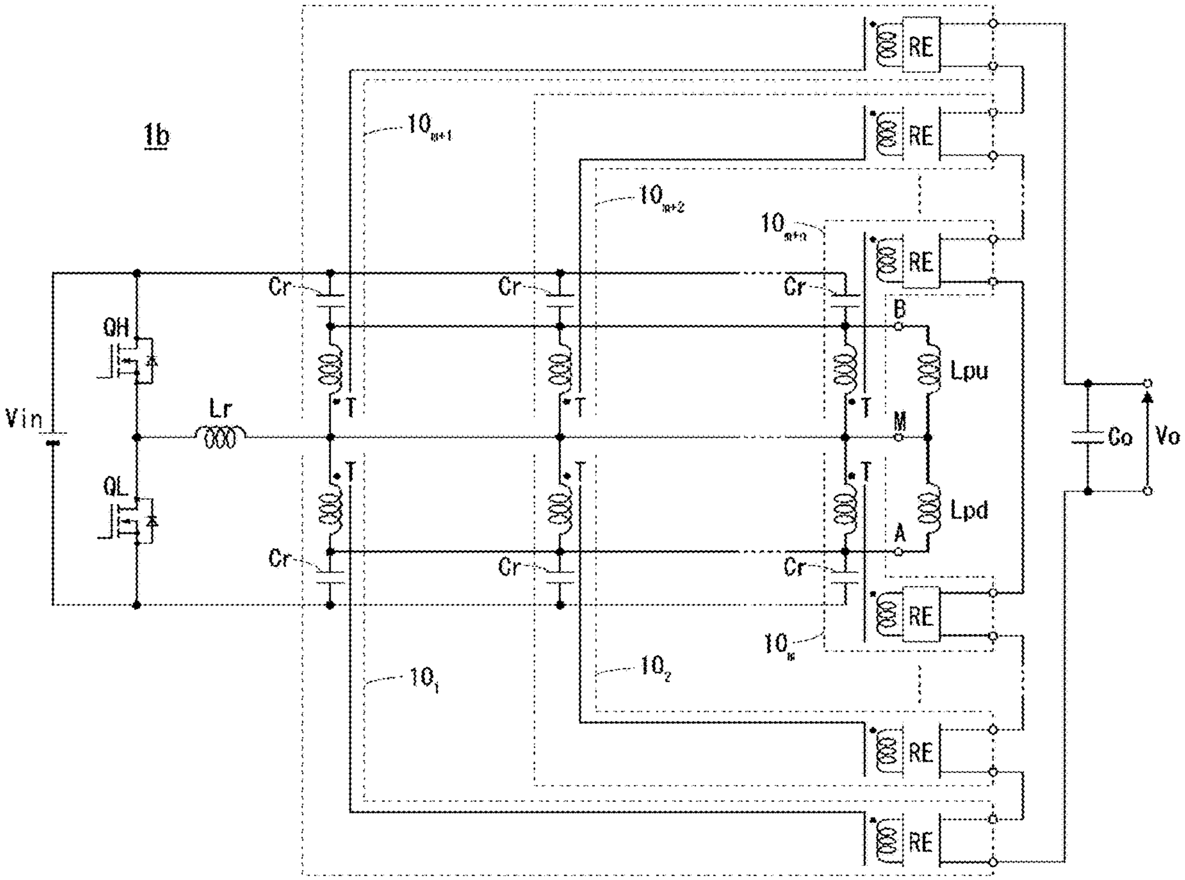
FIG. 5 is a diagram illustrating a configuration example where the outputs of the conversion circuits are connected in series.

In a resonant converter 1*b* illustrated in FIG. 5, outputs of m+n conversion circuits $\mathbf{10}_1$ to $\mathbf{10}_{m+n}$ are connected in series, and the output capacitor Co is collectively connected to the overall output Vo. The adjustment inductor Lpd and the adjustment inductor Lpu may be independent inductors or may be coupled inductors. The output capacitor Co may be divided and connected to each of the m+n conversion circuits $\mathbf{10}_1$ to $\mathbf{10}_{m+n}$. The resonant converter 1*b* can easily increase the output to a higher voltage by connecting the outputs from the m+n conversion circuits $\mathbf{10}_1$ to $\mathbf{10}_{m+n}$ in series.

Figure 6:
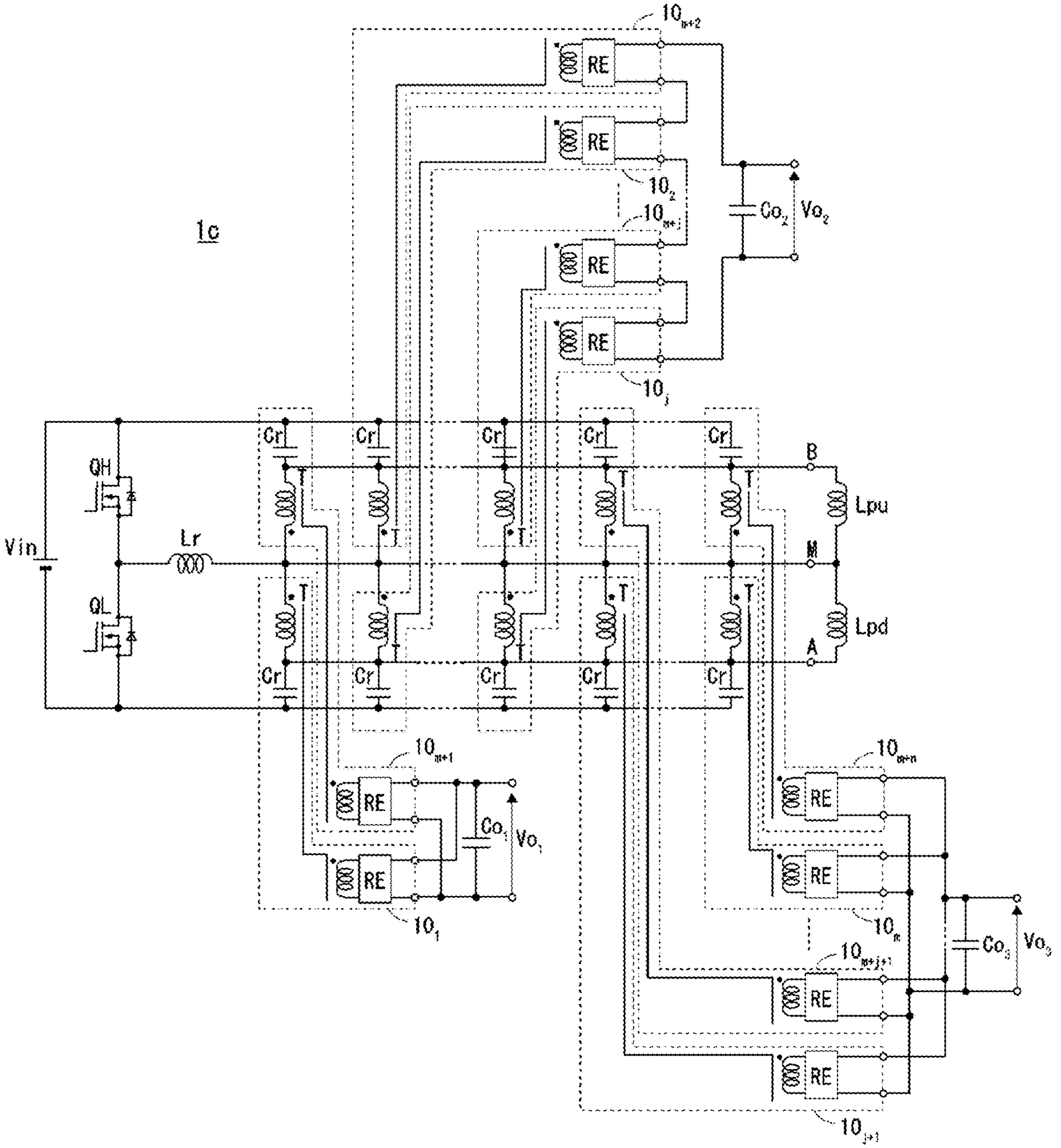
FIG. 6 is a diagram illustrating a configuration example of a multi-output converter.

A resonant converter 1*c* illustrated in FIG. 6 is a multi-output converter that achieves multi-outputs ($Vo_1$, $Vo_2$, and $Vo_3$) including a mix of parallel output and serial output by distributing the m+n conversion circuits $\mathbf{10}_1$ to $\mathbf{10}_{m+n}$ into three sets. The resonant converter 1*c* includes a first output circuit in which the lower conversion circuit $\mathbf{10}_1$ and the upper conversion circuit $\mathbf{10}_{m+1}$ are connected in parallel and that outputs the output $Vo_1$. The resonant converter 1*c* includes a second output circuit in which the lower conversion circuits $\mathbf{10}_{2\ to\ j}$ and the upper conversion circuits $\mathbf{10}_{m+1\ to\ m+j}$ are connected in series to output the output $Vo_2$. The resonant converter 1*c* includes a third output circuit in which the lower conversion circuits $\mathbf{10}_{j+1\ to\ m}$ and the upper conversion circuits $\mathbf{10}_{m+j+1\ to\ m+n}$ are connected in parallel to output the output $Vo_3$. j represents an integer of 1 to m and n. In FIG. 6, output capacitors $Co_1$ to $Co_3$ are provided to each output circuit. The output capacitors $Co_1$ to $Co_3$ may be divided into the m+n conversion circuits $\mathbf{10}_1$ to $\mathbf{10}_{m+n}$, respectively, and provided.

The resonant converter 1*c* can balance currents between the conversion circuits $\mathbf{10}_1$ to $\mathbf{10}_{m+n}$ even in a case of multi-outputs by the adjustment inductor Lpd and the adjustment inductor Lpu. The adjustment inductor Lpd and the adjustment inductor Lpu of the resonant converter 1*c* are independent inductors. Accordingly, the number of the lower conversion circuits $\mathbf{10}_{1\ to\ m}$ is the same as the number of the upper conversion circuits $\mathbf{10}_{m+1\ to\ m+n}$ (m=n). A subtotal of the electrical power output by the lower conversion circuits $\mathbf{10}_{1\ to\ m}$ and a subtotal of electrical power output from the upper conversion circuits $\mathbf{10}_{m+1\ to\ m+n}$ are set to be equal.

Since the adjustment inductor Lpd and the adjustment inductor Lpu can balance the currents between the conversion circuits $\mathbf{10}_1$ to $\mathbf{10}_{m+n}$, a winding ratio of the transformer T of each output circuit may be different.

Figure 7:
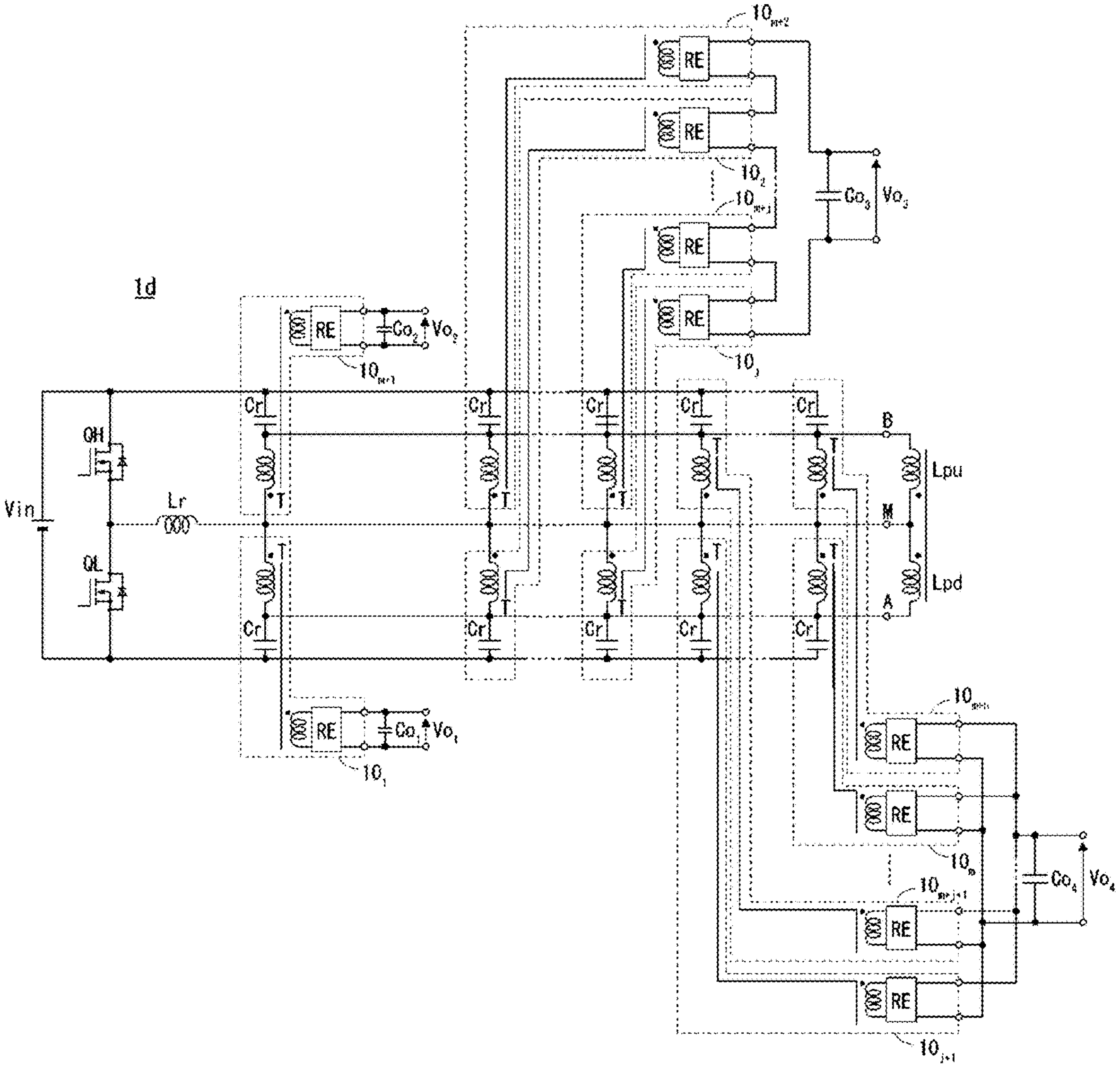
FIG. 7 is a diagram illustrating a configuration example of the multi-output converter.

A resonant converter 1*d* illustrated in FIG. 7 is a multi-output converter that achieves multi-outputs ($Vo_1$, $Vo_2$, $Vo_3$, and $Vo_4$) including a mix of single output, parallel output, and serial output by distributing the m+n conversion circuits $\mathbf{10}_1$ to $\mathbf{10}_{m+n}$ into four sets. The resonant converter 1*d* includes as a first output circuit the lower conversion circuit $\mathbf{10}_1$ that outputs the output $Vo_1$. The resonant converter 1*d* includes as a second output circuit the upper conversion circuit $\mathbf{10}_{m+1}$ that outputs the output $Vo_2$. The resonant converter 1*d* includes a third output circuit in which the lower conversion circuits $\mathbf{10}_{2\ to\ j}$ and the upper conversion circuits $\mathbf{10}_{m+1\ to\ m+j}$ are connected in series to output the output $Vo_3$. The resonant converter 1*d* includes a fourth output circuit in which the lower conversion circuits $\mathbf{10}_{j+1\ to\ m}$ and the upper conversion circuits $\mathbf{10}_{m+j+1\ to\ m+n}$ are connected in parallel to output the output $Vo_4$. In FIG. 6, the output capacitors $Co_1$ to $Co_4$ are provided to each output circuit. The output capacitors $Co_1$ to $Co_4$ may be divided into the m+n conversion circuits $\mathbf{10}_1$ to $\mathbf{10}_{m+n}$, and provided.

The adjustment inductor Lpd and the adjustment inductor Lpu of the resonant converter 1*d* are coupled inductors. Accordingly, the number of the lower conversion circuits $\mathbf{10}_{1\ to\ m}$ and the number of the upper conversion circuits $\mathbf{10}_{m+1\ to\ m+n}$ may be different (even if m≠n). Even if the numbers of conversion circuits used from the lower conversion circuits $\mathbf{10}_{1\ to\ m}$ and the upper conversion circuits $\mathbf{10}_{m+1\ to\ m+n}$ are different between the upper and lower sides in each output circuit, or even if the subtotals of the electrical power output from the conversion circuits are different between the upper and lower sides, it is possible to balance the currents between the conversion circuits $\mathbf{10}_1$ to $\mathbf{10}_{m+n}$.

Since the adjustment inductor Lpd and the adjustment inductor Lpu can balance the currents between the conversion circuits $\mathbf{10}_1$ to $\mathbf{10}_{m+n}$, a winding ratio of the transformer T of each output circuit may be different.

Figure 8:
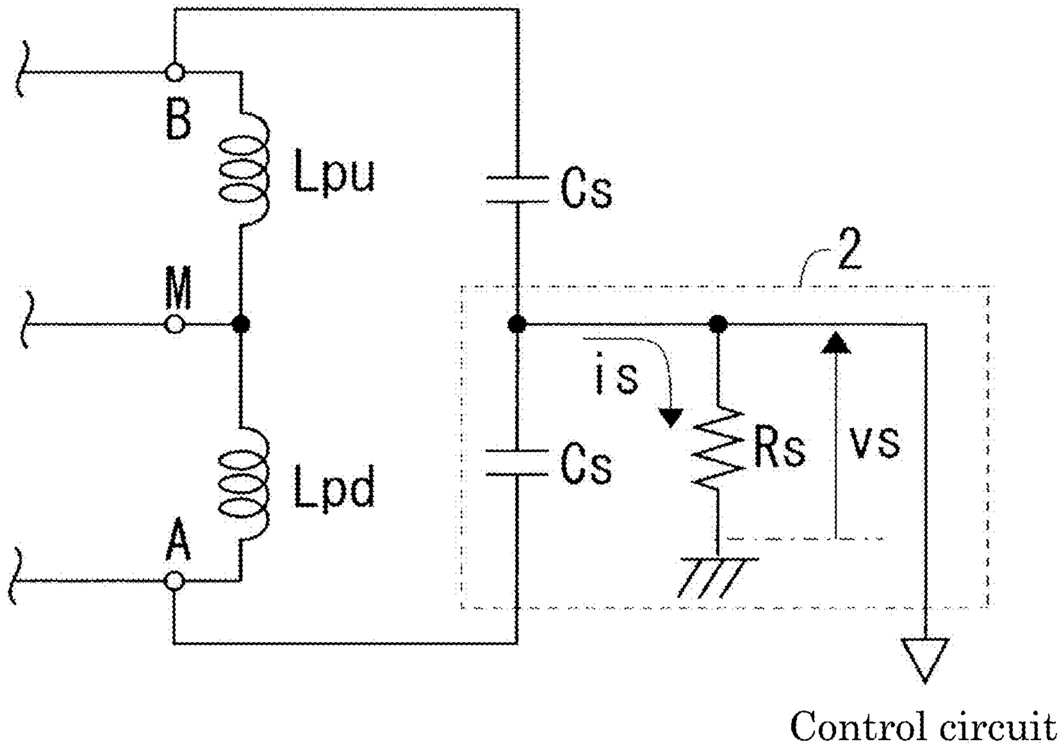
FIG. 8 is a diagram illustrating a configuration example of a current detection circuit that detects a current flowing through a resonant inductor.

The resonant converters 1 to 1*d* include the external terminals M, A, and B that connect the adjustment inductor Lpd and the adjustment inductor Lpu as external inductors. The external terminals A and B can be used as connection terminals of a current detection circuit 2 illustrated in FIG. 8.

The current detection circuit 2 includes two shunt capacitors Cs connected in series between external terminals A and B. The shunt capacitor Cs is sufficiently smaller than the resonant capacitor Cr, and is set a capacitance that does not influence an operation of the resonant converter 1. The current detection circuit 2 includes a detection resistor Rs connected between a connection point of the two shunt capacitors Cs and the negative electrode of the direct current power supply Vin. A current is flowing through the detection resistor Rs is a resonant inductor current shunted between the m+n resonant capacitors Cr and the two shunt capacitors Cs. A voltage vs generated in the detection resistor Rs by the current is input as a current detection value to a control unit that performs on/off control on the upper switch QH and the lower switch QL.

The current is flowing through the detection resistor Rs is determined according to a capacitance ratio of the resonant capacitor Cr and the shunt capacitor Cs regardless of the number of the conversion circuits $\mathbf{10}_1$ to $\mathbf{10}_{m+n}$. Accordingly, the current detection circuit 2 can easily detect the current flowing through the resonant inductor Lr. The number of the current detection circuits 2 may be one regardless of the number of the conversion circuits $\mathbf{10}_1$ to $\mathbf{10}_{m+n}$, and it is not necessary to change a gain setting of a control circuit 20 according to the number of the conversion circuits $\mathbf{10}_1$ to $\mathbf{10}_{m+n}$.

Figure 9:
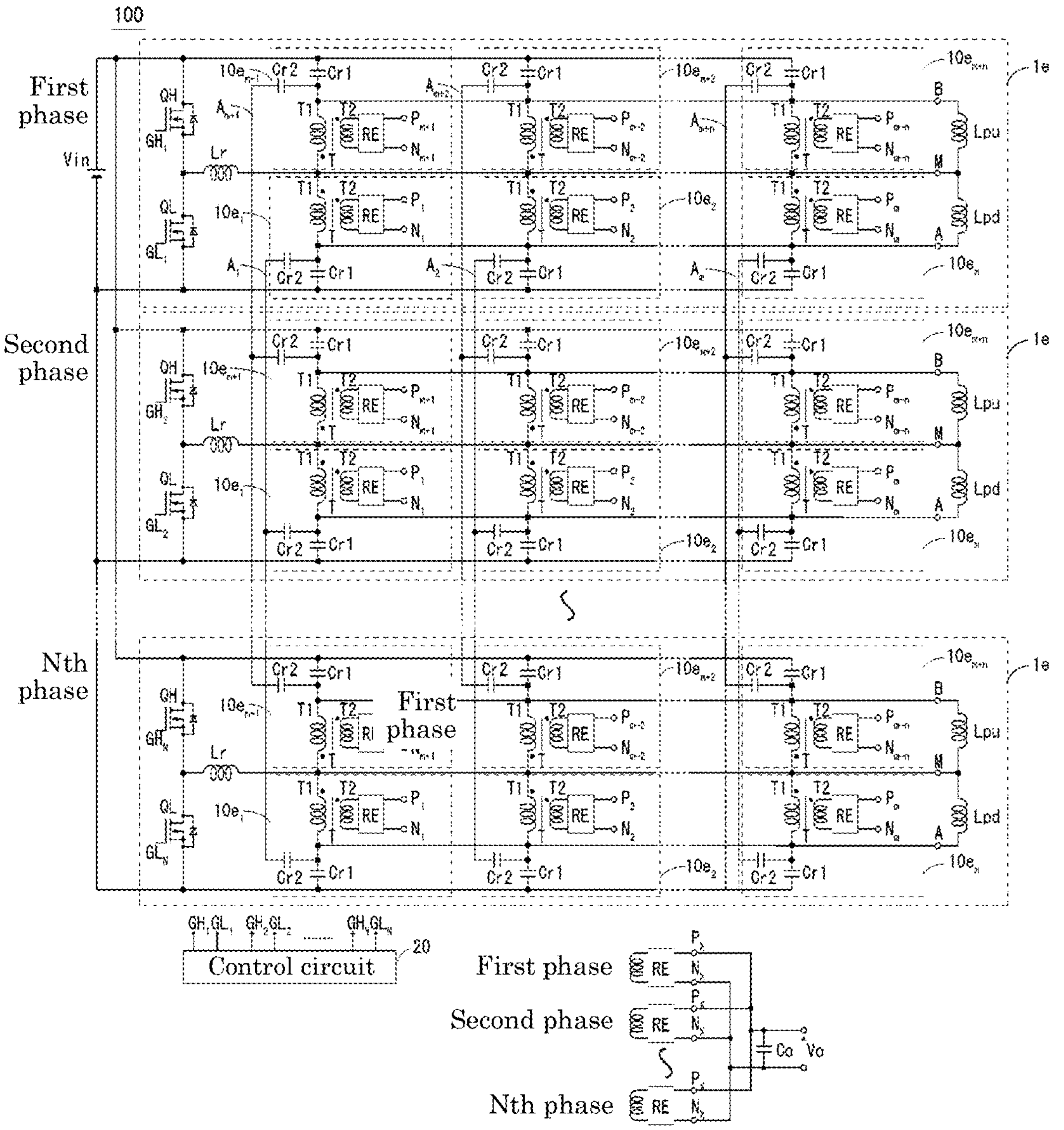
FIG. 9 is a diagram illustrating a circuit configuration according to an example embodiment of a multiphase LLC resonant converter.

In FIG. 9, N (N represents an integer equal to or more than two) resonant converters 1*e* are connected in parallel to the direct current power supply Vin, and are configured as a multiphase LLC resonant converter 100 of N phases including a first phase to an Nth phase.

The resonant converter 1*e* includes the upper switch QH and the lower switch QL as switching legs connected in series between the positive electrode of the direct current power supply Vin and the negative electrode of the direct current power supply Vin.

The resonant converter 1*e* includes the resonant inductor Lr having the one end connected to the connection point of the upper switch QH and the lower switch QL.

The resonant converter 1*e* includes m conversion circuits $\mathbf{10}e_1$ to $\mathbf{10}e_m$ and n conversion circuits $\mathbf{10}e_m$ to $\mathbf{10}e_{m+n}$. The conversion circuit $\mathbf{10}e_1$ to $\mathbf{10}e_m$ and the conversion circuits $\mathbf{10}e_m$ to $\mathbf{10}e_{m+n}$ each include the transformer T, a first resonant capacitor Cr1, a second resonant capacitor Cr2, and the rectifier RE. m and n represent integers equal to or more than zero, and one of m and n is two or more.

In the m conversion circuits $\mathbf{10}e_1$ to $\mathbf{10}e_m$, the one end of the primary winding T1 of each transformer T is connected to the other end of the resonant inductor Lr, and the other end of the primary winding T1 of the transformer T is connected to the negative electrode of the direct current power supply Vin via the first resonant capacitor Cr1.

In the m conversion circuits $\mathbf{10}e_1$ to $\mathbf{10}e_m$, the one end of the primary winding T1 of each transformer T is connected to the other end of the resonant inductor Lr, and the other end of the primary winding T1 of the transformer T is connected to each of neutral points $A_{1\ to\ m}$ via the second resonant capacitor Cr2.

In the n conversion circuits $\mathbf{10}e_{m+1}$ to $\mathbf{10}e_{m+n}$, the one end of the primary winding T1 of each transformer T is connected to the other end of the resonant inductor Lr, and the other end of the primary winding T1 of the transformer T is connected to the positive electrode of the direct current power supply Vin via the first resonant capacitor Cr1.

In the n conversion circuits $\mathbf{10}e_{m+1}$ to $\mathbf{10}e_{m+n}$, the one end of the primary winding T1 of each transformer T is connected to the other end of the resonant inductor Lr. In the n conversion circuits $\mathbf{10}e_{m+1}$ to $\mathbf{10}e_{m+n}$, the other ends of the primary windings T1 of the transformers T are connected to neutral points $A_{m+1\ to\ m+n}$ via the second resonant capacitor Cr2.

A neutral point $A_x$ (x=an integer of one to m and m+1 to m+n) is a common node that connects the first phase to the Nth phase, and is connected with the other end of the second resonant capacitor Cr2 of a conversion circuit $\mathbf{10}e_x$ in the resonant converter 1*e* of the first phase to the Nth phase. The primary winding T1 of the transformer T in the resonant converter 1*e* of the first phase to the Nth phase is star-connected at the neutral point $A_x$ via the second resonant capacitor Cr2 to balance the currents of the first phase to the Nth phase.

The capacities of the first resonant capacitor Cr1 and the second resonant capacitor Cr2 are set such that a value (Cr1+Cr2) obtained by adding the capacities becomes an electrostatic capacitance of the resonant capacitor Cr necessary to obtain the desired resonance frequency $\omega_r$.

In the m conversion circuits $\mathbf{10}e_1$ to $\mathbf{10}e_m$ and the n conversion circuits $\mathbf{10}e_{m+1}$ to $\mathbf{10}e_{m+n}$, each rectifier RE rectifies the alternating current output from the secondary winding T2 of the transformer T. The rectifier RE outputs output voltages from high potential output terminals $P_1$ to $P_{m+n}$ and low potential output terminals $N_1$ to $N_{m+n}$.

A high potential output terminal $P_x$ and a low potential output terminal $N_x$ of at least the first phase to the Nth phase are connected (connected to the same load) as illustrated in FIG. 9. Accordingly, the multiphase LLC resonant converter 100 includes (m+n) outputs obtained by adding m outputs of the conversion circuit $\mathbf{10}e_1$ to $\mathbf{10}e_m$ and n outputs of the conversion circuit $\mathbf{10}e_{m+1}$ to $\mathbf{10}e_{m+n}$ at maximum. The outputs of the m conversion circuits $\mathbf{10}e_1$ to $\mathbf{10}e_m$ and the outputs of the n conversion circuits $\mathbf{10}e_{m+1}$ to $\mathbf{10}e_{m+n}$ may be connected in parallel as illustrated in FIG. 4, or may be connected in series as illustrated in FIG. 5. The outputs of the m conversion circuits $\mathbf{10}e_1$ to $\mathbf{10}e_m$ and the outputs of the n conversion circuits $\mathbf{10}e_{m+1}$ to $\mathbf{10}e_{m+n}$ may be distributed into a plurality of sets as illustrated in FIG. 6.

The N resonant converters 1*e* each include the adjustment inductor Lpd and the adjustment inductor Lpu that adjust the circulating current $I_{CC}$ corresponding to the excitation current of the conventional LLC resonant converter. The adjustment inductor Lpd is connected in parallel with the primary windings T1 of the transformers T of the conversion circuits $\mathbf{10}e_{1\ to\ m}$, and adjusts the circulating currents $I_{CC}$ of the m LLC resonant converters formed in the lower arm. The adjustment inductor Lpu is connected in parallel with the primary windings T1 of the transformers T of the conversion circuits $\mathbf{10}e_{m+1\ to\ m+n}$, and adjusts the circulating currents $I_{CC}$ of the n LLC resonant converters formed in the upper arm.

The multiphase LLC resonant converter 100 includes the control circuit 20 that alternately turns on and off the upper switch QH and the lower switch QL.

The control circuit 20 generates and outputs upper switch gate signals $GH_1$ to $GH_N$ and lower switch gate signals $GL_1$ to $GL_N$ for driving upper switches $QH_1$ to $QH_N$ and lower switches $QL_1$ to $QL_N$, respectively. The control circuit 20 controls the upper switch gate signal $GH_1$ and the lower switch gate signal $GL_1$, the upper switch gate signal $GH_2$ and the lower switch gate signal $GL_2$, . . . , and the upper switch gate signal $GH_N$ and the lower switch gate signal $GL_N$ with phase differences of 360°/N, and performs an N-phase multiphase operation.

Figure 10A:
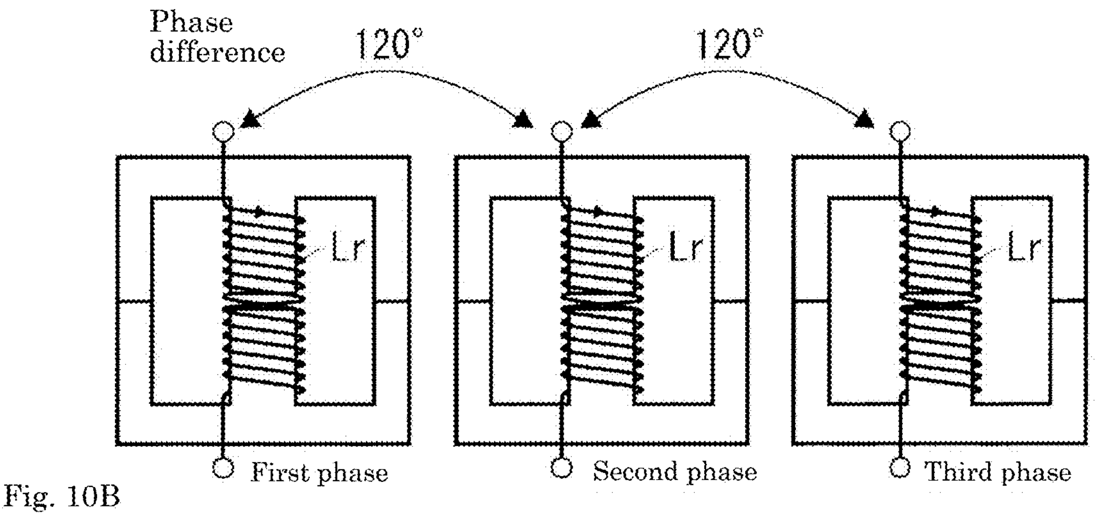
FIGS. 10A to 10C are diagrams illustrating a configuration example of the resonant inductor illustrated in FIG. 9.
Figure 10B:
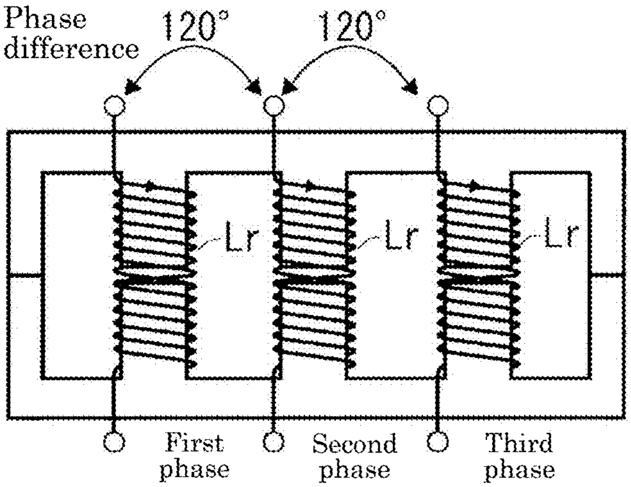

The resonant inductors Lr of the first phase to the Nth phase may be integrated. In the case of the three-phase multiphase LLC resonant converter 100, as illustrated in FIG. 10A, the resonant inductors Lr for the three phases can be integrated using a five-leg core as illustrated in FIG. 10B instead of using three three-leg cores.

In a case where the five-leg core is used, the resonant inductor Lr (winding) is wound around each of three middle legs each having a gap, and the two outer legs are used together. In the case where the five-leg core is used, the volume of the resonant inductor Lr corresponding to four outer legs can be reduced compared to a case where the three three-leg cores are used. Since magnetic fluxes flowing from the three middle legs pass through the two outer legs having no gap, the phases are not coupled. The magnetic fluxes are synthesized in the outer legs, so that the magnetic fluxes are reduced, and iron loss is reduced.

Figure 10C:
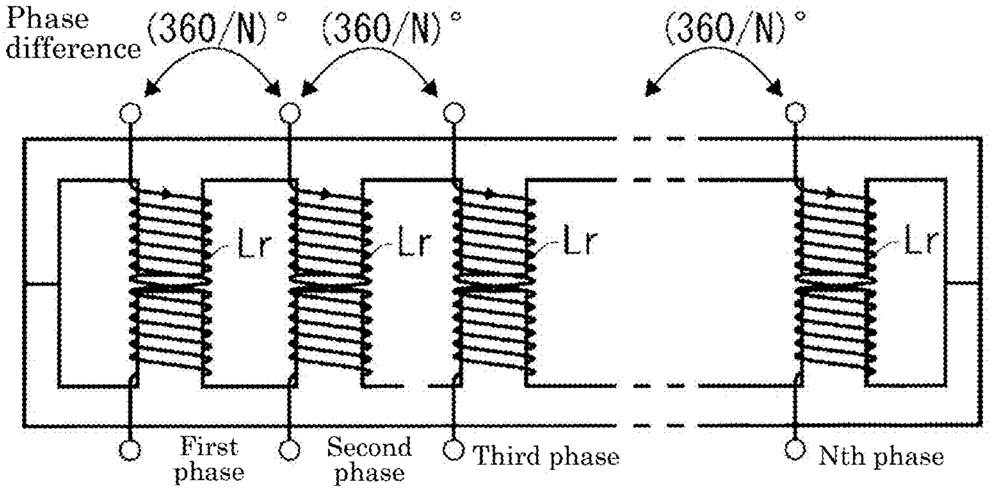

In the case of the three-phase multiphase LLC resonant converter 100, the resonant inductors Lr for the N phases can be integrated using the (N+2)-leg core as illustrated in FIG. 10C.

In a case where the (N+2)-leg core is used, a winding (resonant inductors Lr) is wound around each of N middle legs having a gap, and the two outer legs are used together.

In the case where the (N+2)-leg core is used, the volume of the resonant inductor Lr corresponding to (N+1) outer legs can be reduced compared to the case where N three-leg cores are used. Since the magnetic fluxes flowing from the N middle legs pass through the two outer legs having no gap, the phases are not coupled. The magnetic fluxes are synthesized in the outer legs, so that the magnetic fluxes are reduced, and iron loss is reduced.

(1) The multiphase LLC resonant converter 100 according to each example embodiment of the present invention is the multiphase LLC resonant converter 100 of N phases that causes the N (N represents an integer equal to or more than two) resonant converters 1*e* connected in parallel to the direct current power supply Vin to operate with a phase difference of 360°/N. The resonant converter 1*e* includes the upper switch QH and the lower switch QL connected in series to both ends of the direct current power supply Vin. The resonant converter 1*e* includes the resonant inductor Lr having the one end connected to the connection point of the upper switch QH and the lower switch QL. The resonant converter 1*e* includes the m lower conversion circuits $\mathbf{10}e_{1\ to\ m}$ each including the transformer T including the primary winding T1 and the secondary winding T2, the first resonant capacitor Cr1 and the second resonant capacitor Cr2, and the rectifier RE. The one end of each of the first resonant capacitor Cr1 and the second resonant capacitor Cr2 is connected to the primary winding T1. The rectifier RE is connected to both ends of the secondary winding T2. In the m lower conversion circuits $\mathbf{10}e_{1\ to\ m}$, the primary winding T1 and the first resonant capacitor Cr1 are connected between the other end of the resonant inductor Lr and the negative electrode of the direct current power supply Vin. The m lower conversion circuits $\mathbf{10}e_{1\ to\ m}$ configure the LLC resonant converter that operates by the on/off operations of the upper switch QH and the lower switch QL together with the resonant inductor Lr. The resonant converter 1*e* includes the n upper conversion circuits $\mathbf{10}e_{m+1\ to\ m+n}$ each including the transformer T, the first resonant capacitor Cr1 and the second resonant capacitor Cr2, and the rectifier RE. In the n upper conversion circuits $\mathbf{10}e_{m+1\ to\ m+n}$, the primary winding T1 and the first resonant capacitor Cr1 are connected between the other end of the resonant inductor Lr and the positive electrode of the direct current power supply Vin. The n upper conversion circuits $\mathbf{10}e_{m+1\ to\ m+n}$ configure the LLC resonant converter that operates by the on/off operations of the upper switch QH and the lower switch QL together with the resonant inductor Lr. The resonant converter 1*e* includes the adjustment inductor Lpd (lower adjustment inductor) connected in parallel with the primary windings T1 of the m lower conversion circuits $\mathbf{10}e_{1\ to\ m}$. The resonant converter 1*e* includes the adjustment inductor Lpu (upper adjustment inductor) connected in parallel with the primary windings T1 of the n lower conversion circuits $\mathbf{10}e_{m+1\ to\ m+n}$. The other ends of the second resonant capacitors Cr2 in the lower conversion circuits $\mathbf{10}e_{1\ to\ m}$ are connected with the other ends of the second resonant capacitors Cr2 in the lower conversion circuits $\mathbf{10}e_{1\ to\ m}$ of the other phases at the common neutral points $A_{1\ to\ m}$ that connect the respective phases. The other ends of the second resonant capacitors Cr2 in the upper conversion circuits $\mathbf{10}e_{m+1\ to\ m+n}$ are connected with the other ends of the second resonant capacitors Cr2 in the upper conversion circuits $\mathbf{10}e_{m+1\ to\ m+n}$ of the other phases at the common neutral points $A_{m+1\ to\ m+n}$ that connect the respective phases. Outputs (the high potential output terminals $P_1$ to $P_{m+n}$ and the low potential output terminals $N_1$ to $N_{m+n}$) of the lower conversion circuits 1001 to m and the upper conversion circuits $\mathbf{10}e_{m+1\ to\ m+n}$ star connected at neutral points $A_{1\ to\ m+n}$ via the second resonant capacitor Cr2 are connected.

According to the multiphase LLC resonant converter 100 described in above (1), the currents are balanced even if the conversion circuits $\mathbf{10}_1$ to m and the upper conversion circuits $\mathbf{10}_{m+1\ to\ m+n}$ are extended in parallel, so that it is possible to enjoy an advantage of multiphasing (input/output current ripple reduction, output voltage ripple reduction, and the like), and, moreover, easily achieve higher power or higher integration. Each of the plurality of outputs can be increased to higher power, so that the multiphase LLC resonant converter 100 can be applied to, for example, an EV quick charge station including a plurality of charging ports.

(2) In the multiphase LLC resonant converter 100 described in above (1), the resonant inductor Lr of each phase uses a core of (N+2) legs including the N middle legs having gaps, and the two outer legs, and is wound around each of the N middle legs.

According to the multiphase LLC resonant converter 100 described in above (2), the resonant inductor Lr can reduce the volume corresponding to the (N+1) outer legs. The magnetic fluxes are synthesized in the outer legs, so that the magnetic fluxes are reduced, and iron loss is reduced.

(3) In the multiphase LLC resonant converter 100 in above (1) or (2), the adjustment inductor Lpd and the adjustment inductor Lpu can be used as the coupled inductors.

According to the multiphase LLC resonant converter 100 described in above (3), even if the number of the lower conversion circuits $\mathbf{10}_{1\ to\ m}$ is different from the number of the upper conversion circuits $\mathbf{10}_{m+1\ to\ m+n}$ (even if m≠n), it is possible to balance currents between the m+n conversion circuits $\mathbf{10}_1$ to $\mathbf{10}_{m+n}$. The adjustment inductor Lpd and the adjustment inductor Lpu can reduce variations of inductances. The number of cores used for the adjustment inductor Lpd and the adjustment inductor Lpu may be one. The numbers of turns of windings of the adjustment inductor Lpd and the adjustment inductor Lpu can be reduced compared to the case of the independent inductor.

(4) In the multiphase LLC resonant converter 100 in above (1) to (3), the excitation inductances of the transformers T of the lower conversion circuits $\mathbf{10}_{1\ to\ m}$ and the upper conversion circuits $\mathbf{10}_{m+1\ to\ m+n}$ are set to be larger than the inductances of the adjustment inductors Lpd and Lpu.

According to the multiphase LLC resonant converter 100 described in above (4), the transformer T can use a gapless core.

(5) In the multiphase LLC resonant converter 100 in above (4), the excitation inductances of the transformers T of the lower conversion circuits $\mathbf{10}_{1\ to\ m}$ and the upper conversion circuits $\mathbf{10}_{m+1\ to\ m+n}$ are set to be 10 times or more than the inductances of the adjustment inductors Lpd and Lpu.

According to the multiphase LLC resonant converter 100 described in above (5), the transformer T can use a gapless core.

(6) In the multiphase LLC resonant converter 100 in above (1) to (3), like the resonant converter 1*a*, the outputs of the m lower conversion circuits $\mathbf{10}_{1\ to\ m}$ and the outputs of the n upper conversion circuits $\mathbf{10}_{m+1\ to\ m+n}$ can be connected in parallel.

The multiphase LLC resonant converter 100 described in above (6) can easily increase the output to a larger current.

(7) In the multiphase LLC resonant converter 100 in above (1) to (3), like the resonant converter 1*b*, the outputs of the m lower conversion circuits $\mathbf{10}_{1\ to\ m}$ and the outputs of the n upper conversion circuits $\mathbf{10}_{m+1\ to\ m+n}$ can be connected in series.

The multiphase LLC resonant converter 100 described in above (7) can easily increase the output to a higher voltage.

(8) In the multiphase LLC resonant converter 100 in above (1) to (3), like the resonant converters 1*c* and 1*d*, the outputs of the m lower conversion circuits $\mathbf{10}_{1\ to\ m}$ and the outputs of the n upper conversion circuits $\mathbf{10}_{m+1\ to\ m+n}$ can be distributed into a plurality of sets to configure the multi-output converter.

The multiphase LLC resonant converter 100 described in above (8) can easily support multi-outputs.

(9) The multiphase LLC resonant converter 100 in above (1) to (3) further includes the external terminal M (intermediate external terminal) that is connected to the connection point of the other end of the resonant inductor Lr and the one end of each of the primary windings T1 of the upper and lower conversion circuits, the external terminal A (lower external terminal) that is connected to the connection point of the other ends of the primary windings T1 of the lower conversion circuits $\mathbf{10}_{1\ to\ m}$ and the one end of the first resonant capacitor Cr1, and the external terminal B (upper external terminal) that is connected to the connection point of the other ends of the primary windings T1 of the upper conversion circuits $\mathbf{10}_{m+1\ to\ m+n}$ and the one end of the first resonant capacitor Cr1. The adjustment inductor Lpd is connected as the external inductor between the external terminal M and the external terminal A, and the adjustment inductor Lpu is connected as the external inductor between the external terminal M and the external terminal B.

According to the multiphase LLC resonant converter 100 described in above (9), the adjustment inductor Lpd and the adjustment inductor Lpu can easily adjust the inductances. The external terminals A and B can be used as the terminals for connection of the current detection circuit 2, and the current detection circuit 2 can easily detect the current flowing through the resonant inductor Lr.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multiphase LLC resonant converter comprising:

N phases, where N represents an integer equal to or greater than two; and

N resonant converters connected in parallel to a direct current power supply and configured to operate with a phase difference of 360°/N; wherein each of the N resonant converters includes:

an upper switch and a lower switch connected in series between a positive electrode and a negative electrode of the direct current power supply;

a resonant inductor including a first end connected to a connection point of the upper switch and the lower switch;

m lower conversion circuits, where m represents an integer equal to or greater than two, each including a transformer including a primary winding and a secondary winding, a first resonant capacitor and a second resonant capacitor each including a first end connected to the primary winding, and a rectifier connected to both ends of the secondary winding, the primary winding and the first resonant capacitor being connected between a second end of the resonant inductor and the negative electrode of the direct current power supply to configure the multiphase LLC resonant converter to operate by on/off operations of the upper switch and the lower switch together with the resonant inductor;

n upper conversion circuits, where n represents an integer equal to or greater than two, each including a transformer, a first resonant capacitor and a second resonant capacitor, and a rectifier, a primary winding and the first resonant capacitor being connected between the second end of the resonant inductor and the positive electrode of the direct current power supply to configure the multiphase LLC resonant converter to operate by the on/off operations of the upper switch and the lower switch together with the resonant inductor;

a lower adjustment inductor connected in parallel with the primary windings of the m lower conversion circuits;

an upper adjustment inductor connected in parallel with the primary windings of the n upper conversion circuits;

a second end of the second resonant capacitor in the lower conversion circuit is connected with the second end of the second resonant capacitor in the lower conversion circuit of another phase at a common neutral point that connects the phases, and a second end of the second resonant capacitor in the upper conversion circuit is connected with the second end of the second resonant capacitor in the upper conversion circuit of the other phase at the common neutral point that connects the phases;

outputs of the m lower conversion circuits and the n upper conversion circuits in each of the N resonant converters are star-connected at the common neutral point via the respective second resonant capacitor;

an intermediate external terminal connected to a connection point of the second end of the resonant inductor and a first end of each of the primary windings of the upper conversion circuit and the lower conversion circuit;

a lower external terminal connected to a connection point of a second end of the primary winding of the lower conversion circuit and the first end of the first resonant capacitor; and an upper external terminal connected to a connection point of a second of the primary winding of the upper conversion circuit and the first end of the first resonant capacitor; wherein the lower adjustment inductor is connected as an external inductor between the intermediate external terminal and the lower external terminal, and the upper adjustment inductor is connected as an external inductor between the intermediate external terminal and the upper external terminal.

2. The multiphase LLC resonant converter according to claim 1, wherein the resonant inductor in the resonant converter of each of the N phases includes a core including (N+2) legs including N middle legs including gaps and two outer legs, and is wound around each of the N middle legs.

3. The multiphase LLC resonant converter according to claim 2, wherein the multiphase LLC resonant converter is a multi-output converter in which the outputs of the m lower conversion circuits and the outputs of the n upper conversion circuits in each of the N resonant converters are distributed into a plurality of sets.

4. The multiphase LLC resonant converter according to claim 1, wherein in each of the N resonant converters, the lower adjustment inductor and the upper adjustment inductor are coupled inductors.

5. The multiphase LLC resonant converter according to claim 1, wherein in each of the N resonant converters, excitation inductances of the transformers of the m lower conversion circuits and the n upper conversion circuits are larger than inductances of the lower adjustment inductor and the upper adjustment inductor.

6. The multiphase LLC resonant converter according to claim 5, wherein in each of the N resonant converters, the excitation inductances of the transformers of the m lower conversion circuits and the n upper conversion circuits are about 10 times or more of the inductances of the lower adjustment inductor and the upper adjustment inductor.

7. The multiphase LLC resonant converter according to claim 1, wherein in each of the N resonant converters, the outputs of the m lower conversion circuits and the outputs of the n upper conversion circuits are connected in parallel.

8. The multiphase LLC resonant converter according to claim 1, wherein in each of the N resonant converters, the outputs of the m lower conversion circuits and the outputs of the n upper conversion circuits are connected in series.

9. The multiphase LLC resonant converter according to claim 1, wherein each of the N resonant converters further comprising a current detection circuit connected between a connection point of the primary winding of the lower conversion circuit and the first resonant capacitor of the lower conversion circuit and a connection point of the primary winding of the upper conversion circuit and the first resonant capacitor of the upper conversion circuit to detect a current flowing through the resonant inductor.

* * * * *